2,345,785

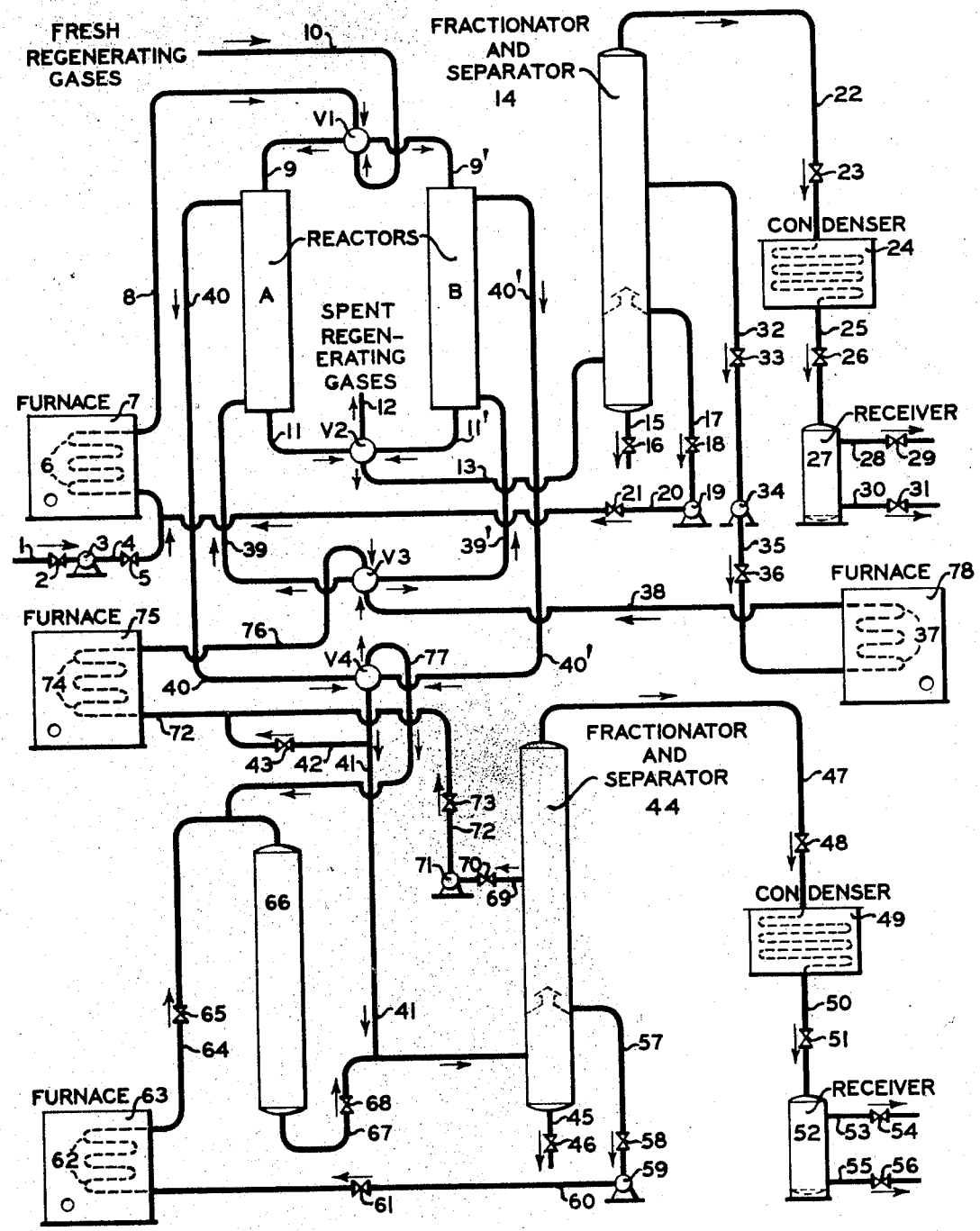
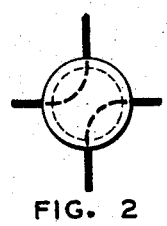
FIG. 2
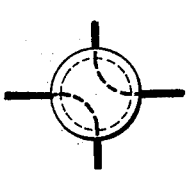
FIG. 3
FIG. 1
INVENTOR
GORDON B. ZIMMERMAN
BY Lee J. Gary
ATTORNEY Patented Apr. 4, 1944

UNITED STATES PATENT OFFICE 2,345,785

HYDROCARBON CONVERSION PROCESS

Gordon B. Zimmerman, Chicago, Ill., assignor to Universal Oil Products Company, Chicago, Ill., a corporation of Delaware Application December 13, 1939, Serial No. 308,930

7 Claims. (Cl. 196—49)

This invention relates to an improved method for converting hydrocarbon oils into more valuable hydrocarbons. More specifically, it is concerned with a process which involves both thermal and catalytic cracking wherein intermediate conversion products formed in the individual steps are employed as the heating and cooling means in the catalytic conversion reaction and the catalyts regeneration, respectively.

The general practice in the catalytic treatment of hydrocarbons is to employ an extraneous material, such as combustion gases, molten salts, or some other suitable fluid medium, to supply heat to and conduct heat from the endothermic and exothermic reaction zones, respectively. Generally speaking, however, there are certain disadvantages which accompany an operation employing heat convective media of the type which have found commercial application. On the one hand, the coefficient of heat transfer of the materials and more specifically combustion gases is relatively low and, on the other hand, the material, such as molten salts, in most cases, is, relatively speaking, very corrosive, and therefore the materials mentioned, both from the standpoint of heat transfer and corrosion, render the operation involving the catalytic treatment of hydrocarbons considerably more expensive than a thermal cracking treatment. Liquids, generally speaking, have a higher coefficient of heat transfer than gases. However, due to the relatively high temperature employed in the catalytic reactions, molten salts are the only liquid materials which have found any great application, largely due to the fact that extremely high temperatures may be encountered before any decomposition takes place. These materials therefore would be the most desirable if it were not for excessive corrosion encountered in the equipment.

In order to obviate the disadvantages inherent in a process employing heating or cooling media of the types referred to above, but at the same time obtain results comparable or better than those obtained from systems employing such media, my invention provides for utilizing intermediate products formed in the process in conducting heat from the exothermic reaction zone and conveying heat to the endothermic reaction zone.

In the catalytic step of my process two or more reactions zones are employed, the fresh or freshly reactivated catalyst in one or more zones being used for effecting conversion of the hydrocarbons subjected to contact therewith, while the catalyst in the other zone or zones is undergoing regeneration by contact with oxygen-containing gases which are used in burning from the catalyst carbonaceous substances deposited thereon. In order to effect the desired heating and cooling in the respective reactors, I prefer to supply heat to the endothermic reaction zone by contacting therewith heated intermediate conversion products formed in the catalytic cracking treatment and to cool the exothermic reaction zone by contacting therewith a hydrocarbon oil at the desired temperature level which is formed in the thermal cracking treatment of the light recycle oil from the catalytic cracking treatment. These materials, as will be described more fully later, have been chosen for the particular duties outlined, because of their refractory character. The intermediate conversion products from the catalytic cracking treatment being the less refractory of the two are employed in supplying heat to the endothermic reaction, while the intermediate conversion products from the thermal cracking treatment of the recycle stock from the catalytic cracking treatment being the more refractory of the two are employed in cooling the exothermic reaction, preference being stated largely for the reason that the exothermic reaction is accomplished at a higher temperature level than the endothermic reaction. It is to be understood, however, that the invention is not limited in this respect, for either one or the other of the two fractions, or both, may be employed as the heat convective medium in either operation.

In one specific embodiment the invention comprises heating and vaporizing the charging oil, together with heavy reflux condensate formed in the catalytic cracking treatment, as hereinafter set forth, and supplying the heated vapors to an endothermic reaction zone containing catalytic material capable of promoting the desired reaction while supplying heat to said endothermic reaction zone, as hereinafter set forth, fractionating the vaporous conversion products to separate fractionated vapors boiling in the range of gasoline and to form light and heavy reflux condensates, recovering said fractionated vapors, subjecting said heavy reflux condensate to treatment as aforesaid, heating said light reflux condensate and subjecting it while in the heated state to contact with the exterior of said endothermic reaction zone to supply the heat of conversion to the materials being converted therein, as previously set forth, commingling the resulting cooled light reflux condensate leaving said endothermic reaction zone with conversion products formed in a subsequent thermal cracking treatment, separating non-vaporous liquid residue from the vaporous hydrocarbons, recovering the former, fractionating said vaporous hydrocarbons to separate gasoline boiling range hydrocarbons from the higher boiling hydrocarbons and condensing the latter in the fractionating zone as the light oil fraction and a heavy oil fraction, recovering said gasoline boiling range by hydrocarbons, subjecting said heavy oil fraction to thermal cracking treatment, heating said light oil fraction to the desired temperature level and subjecting it to contact while in the heated state with the exterior of the exothermic reaction zone containing the catalyst undergoing regeneration to absorb a substantial portion of the heat produced therein, commingling the resulting light oil fraction with the conversion products from the thermal cracking treatment and the light reflux condensate, and subjecting the resulting mixture to separation and fractionation, as previously set forth.

Fig. 1 in the accompanying drawing illustrates diagrammatically in side elevation one specific form of the apparatus which may be employed embodying the broad features of the invention.

Figs. 2 and 3 are details in section of the two-way inlet and outlet valve diagrammatically indicated in Fig. 1, Fig. 2 showing a valve in one position and Fig. 3 showing the passageways therethrough shifted.

Referring now to Fig. 1 in the accompanying drawing, a charging oil for the process which may comprise any hydrocarbon oil capable of being substantially completely vaporized, such as, for example, gas-oil, is introduced through line 1 and valve 2 to pump 3. Pump 3 discharges through line 4 and valve 5 and the charging oil may, when desired, be commingled with heavy reflux condensate separated from the catalytically cracked conversion products, in the manner to be described more fully later, and the mixture introduced to heating coil 6. The mixture in passing through heating coil 6 is substantially completely vaporized therein and raised to the desired conversion temperature which may range, for example, from 600 to 1000° F. by means of heat supplied from furnace 7. The hydrocarbon vapors from heating coil 6 are directed through line 8 to valve V1 and thereafter subjected to treatment in the reactor containing the active catalyst.

In the particular case here illustrated, two reactors A and B are employed each containing a bed of catalytic material capable of promoting the desired cracking reaction when in a fresh or freshly regenerated state. One reactor is at all times employed as a cracking zone, while the catalyst in the other reactor is being reactivated by passing therethrough a stream of relatively inert gases (such as combustion gases, for example) containing controlled amounts of air or oxygen. The reactors are alternately operated with respect to the service for which they are employed (processing and reactivation) by means of switching valves V1, V2, V3, and V4.

Any suitable valve arrangement capable of switching the direction of flow of the stream of reactants and the stream of regenerating gases may be employed within the scope of the invention but, for the sake of simplifying the description and illustrating the process without unnecessary complications, each of the switching valves is here illustrated as a single two-way valve in which the position of the two passageways thereto may be shifted as illustrated in Figs. 2 and 3.

Assuming that valve V1 is adjusted to the position illustrated in Fig. 2, and valves V2, V3, and V4 are adjusted to the position illustrated in Fig. 3, the hydrocarbon vapors in line 8 pass through valve V1 into line 9 and thence into reactor A where they are contacted with a suitable catalytic material contained therein. While the hydrocarbon vapors are in contact with the catalytic material, the endothermic heat of conversion is supplied to the materials being converted, in the manner to be described more fully later.

The preferred cracking catalysts for use in the present process consist in general of a precipitated alumina hydrogel and/or zirconia hydrogel composited with silica hydrogel, the gel composite being washed, dried, formed into particles, and calcined to produce a catalytic mass. The invention, however, is not limited to these particular catalysts, for other catalysts, such as, for example, the hydrosilicates of alumina, acid treated clays, and the like, may be used within the broad scope of the invention.

In the following specification and claims the terms silica, alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia are deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of alumina and/or zirconium salts and an alkaline precipitant, such as ammonium hydroxide, ammonium carbonate or ammonium sulfide added to the solution to precipitate aluminum and/or hydrogels. The final precipitate, comprising essentially hydrated silica and hydrated alumina and/or zirconia, is washed to substantially completely remove water soluble materials and dried at about 300° F. to produce a rather crumbly and granular material which may be ground and pelleted or sized to produce particles of catalyst after which the catalyst particles are calcined at a temperature in the approximate range of 1000 to 1500° F. Various other procedures, such as, for example, co-precipitation of the hydrated gels may be employed, when desired, to produce the preferred catalyst. Temperatures of the order of 600 to 1000° F. and pressures ranging, for example, from substantially atmospheric to 200 pounds or more per square inch superatmospheric may be employed when using the preferred catalyst.

While the hydrocarbon conversion reaction is being accomplished in reactor A, the catalyst in reactor B may be subjected to reactivation treatment by contacting therewith a suitable inert gas, such as combustion gases, containing controlled amounts of air or oxygen. Fresh regenerating gases are introduced to the system through line 10 by means of which they are conducted to valve V1 wherethrough they pass into line 9' and thence into reactor B.

The carbonaceous substances deposited upon the catalyst in the previous processing period are burned therefrom and the exothermic heat of regeneration is absorbed in cooling oil introduced as hereinafter described. Spent regenerating gases from reactor B are directed through line 11' to valve V2 wherethrough they pass into line 12 after which the gases may be exhausted or, when desired, the sensible heat in the gases may be recovered in suitable equipment, not shown, and air or oxygen commingled with the resulting cooled gases and the mixture thereafter returned to reactor B as the fresh regenerating gases.

The conversion products from reactor A are directed through line 11 to valve V2 wherethrough they pass into line 13 by means of which they are supplied to the separating zone of fractionator and separator 14. In the separating zone of fractionator and separator 14 vaporous conversion products are separated from non-vaporous liquid residue and the latter removed by way of line 15 and valve 16, cooled and recovered as a product of the process or subjected to any desired further treatment.

The vaporous conversion products separated in the separating zone are supplied to the fractionating zone of fractionator and separator 14 wherein fractionated vapors boiling in the range of gasoline are separated from the higher boiling hydrocarbons and the latter condensed in the fractionating zone as light and heavy reflux condensates. Heavy reflux condensate collected and separated in fractionator and separator 14 is conducted through line 17 and valve 18 to pump 19 which discharges through line 20 and valve 21 into line 4 for treatment of the heavy reflux condensate in the manner previously described.

Fractionated vapors separated in fractionator and separator 14 are directed through line 22 and valve 23 to cooling and condensation in condenser 24. Distillate, together with undissolved and uncondensed gases from condenser 24, is directed through line 25 and valve 26 into receiver 27 where the distillate and undissolved and uncondensed gases are collected and separated. Gases collected and separated in receiver 27 are removed from the upper portion thereof by way of line 28 and valve 29 and thereafter subjected to any desired further treatment. A portion of the distillate collected and separated in receiver 27 may be returned to the upper portion of fractionator and separator 14, by well known means not shown, for use as a refluxing and cooling medium, and the remaining portion of the distillate from receiver 27 recovered as a product of the process by way of line 30 and valve 31.

Light reflux condensate collected and separated in fractionator and separator 14 is directed through line 32 and valve 33 to pump 34 which discharges through line 35 and valve 36 into heating coil 37. The light reflux condensate in passing through heating coil 37 is heated by means of heat supplied from furnace 78 and preferably to such an extent that the heat content of the oil leaving heating coil 37 is sufficient to supply the necessary heat of conversion to the endothermic reaction being conducted in reactor A. The heated light reflux condensate leaving heating coil 37 is directed through line 38 to valve V3 wherethrough it passes into line 39 by means of which the heated light reflux condensate is supplied to reactor A, passing therethrough in indirect heat exchange relationship with the hydrocarbon vapors being converted in the manner previously described. The light reflux condensate in leaving reactor A, the heat content of which has materially reduced in passing therethrough, is directed through line 40 to valve V4 wherethrough it passes into line 41 and, when desired, a portion or all of the material in line 41 may be directed through line 42 and valve 43 into line 72 for treatment as subsequently described. Preferably, however, all of the material in line 41 is commingled with the conversion products formed in a thermal cracking treatment, as hereinafter described, and the mixture introduced to the separating zone of fractionator and separator 44.

In the separating zone of fractionator and separator 44, vaporous hydrocarbons are separated from non-vaporous liquid residue and the latter removed by way of line 45 and valve 46, cooled and recovered as a product of the process or subjected to any desired further treatment. Vaporous hydrocarbons separated in the manner described are subjected to fractionation in the fractionating zone of said fractionator and separator 44 to separate fractionated vapors boiling in the range of gasoline from the higher boiling hydrocarbons and the latter condensed as light and heavy reflux condensate.

Fractionated vapors removed from fractionator and separator 44 are directed through line 47 and valve 48 to cooling and condensation in condenser 49. Distillate, together with undissolved and uncondensed gases from condenser 49, is directed through line 50 and valve 51 to collection and separation in receiver 52. Undissolved and uncondensed gases collected and separated in receiver 52 are removed from the upper portion thereof by way of line 53 and valve 54 and recovered as a product of the process or subjected to any desired further treatment. A portion of the distillate collected and separated in receiver 52 is returned to the upper portion of fractionator and separator 44, by well known means not shown, for use as a refluxing and cooling medium. The remaining portion of the distillate in receiver 52 is recovered as a product of the process by way of line 55 and valve 56.

Heavy reflux condensate collected and separated in fractionator and separator 44 is directed through line 57 and valve 58 to pump 59 which discharges through line 60 and valve 61 into heating coil 62. The heavy reflux condensate in passing through heating coil 62 is raised to the desired conversion temperature which may range for example from 800 to 1100° F. or more, by means of heat supplied from furnace 63, and preferably also the oil is maintained at the conversion temperature in heating coil 62 for a sufficient period of time to effect substantial thermal cracking thereof. The heated oil leaving heating coil 62 is directed through line 64 and valve 65, commingled with a cooling oil removed from the exothermic catalytic reaction zone, as hereinafter described, and the mixture introduced to reaction chamber 66. The oil in passing through reaction chamber 66 is subjected to prolonged conversion at the elevated temperature, the vaporous liquid conversion products being discharged therefrom through line 67 and valve 68 and commingled with the heating medium removed from the endothermic catalytic reaction zone, as previously described, and the mixture thereafter subjected to treatment, as previously described.

The light reflux condensate collected and separated in fractionator and separator 44 is directed through line 69 and valve 70 to pump 71 which discharges through line 72 and valve 73. The light reflux condensate may, when desired, be commingled with the light reflux condensate employed as a heating medium in the endothermic reaction and removed from line 41 by way of line 42 and valve 43 and this mixture or the light reflux condensate alone is introduced to heating coil 74 by way of line 72. The light reflux condensate in heating coil 74 is heated by means of heat supplied from furnace 75 to a temperature sufficient to initiate and maintain the burning of the carbonaceous deposits in the exothermic catalyst regeneration reaction. The heated oil leaving heating coil 74 is directed through line 76 to valve V3 wherethrough it passes into line 39' by means of which it is conducted to reactor B, passing therethrough in contact with the exterior of the exothermic reaction zone, whereby the heat formed upon burning the carbonaceous substances is absorbed. The light reflux condensate leaving reaction B is directed through line 40' to valve V4 wherethrough it passes into line 77 by means of which it is introduced into line 64, commingling therein with the conversion products from heating coil 62, as previously described.

In the catalytic cracking operation as above described, when the catalyst in reactor A approaches the state of reduced activity at which time it is advantageous to apply freshly regenerated catalyst for the treatment of the vapors, the supply of air to the regenerating gas stream is momentarily discontinued so that reactor B is purged of oxygen-containing gases, and after reactor B has been purged of oxygen-containing gases valve V1 is switched to the position indicated in Fig. 3, at which time oxygen-free gases are introduced to reactor A and hydrocarbon vapors to reactor B. After a short lag, corresponding to the time required to drive the vapors from reactor A and the oxygen-free gases from reactor B, valve V2 is switched to the position indicated in Fig. 2, at which time oxygen is again admitted to the regenerating gas stream.

Either prior to or subsequent to the switching of valves V1 and V2, valves V3 and V4 may be switched to the position indicated in Fig. 2 in order that the proper heating and cooling may be effected in reactors A and B. After switching valves V1, V2, V3, and V4, the flow of hydrocarbon vapors in line 8 will be through valve V1 and line 9' into reactor B, while the flow of conversion products from reactor B will be through line 11', valve V2, and line 13 into fractionator and separator 14. The flow of fresh regenerating gases, on the other hand, will be through valve V1 and line 9 into reactor A and the spent regenerating gases from reactor A will flow through line 11 and valve V2 into line 12. The flow of the heating medium in line 38 will be through valve V3 and line 39' into reactor B and the flow of the heating medium from reactor B will be through line 40' and valve V4 into line 41, the flow thereafter being substantially as described. The flow of the cooling medium in line 76 for use in the exothermic reaction will be through valve V3 and line 39 into reactor A and the cooling medium from reactor A will be directed through line 40 and valve V4 into line 77, the flow thereafter being substantially as described.

Switching of the stream of hydrocarbon vapors and reactivating gases is periodically repeated by reversing the position of the switching valves so that the partially spent catalytic material in one reactor is continuously being reactivated and the stream of hydrocarbon vapors is continuously converted in the other reactor. Preceding the change of function of each reactor, each is purged with relatively inert gases and, preferably as indicated in the foregoing description, there is sufficient lag between the switching of the various valves to prevent loss of valuable conversion products from the reactors being purged thereof and to prevent the commingling of inert gases from the reactors which have been purged with the stream of conversion products.

The switching valves may be manually operated but, preferably to simplify operation of the process and to avoid mistakes in the operation of the valves, all of the valves will preferably operate from a single time cycle controller of any well known form in accordance with a definite predetermined schedule.

An example of one specific operation of the process is approximately as follows:

Charging oil comprising a 36° A. P. I. gravity Mid-continent gas-oil was subjected to conversion in the presence of a silica-alumina-zirconia catalyst in a reaction zone at a temperature of 875° F. and at a pressure of approximately 40 pounds per square inch. Simultaneously therewith, the catalyst in another reaction zone was subjected to regeneration by contacting therewith combustion gases heated to approximately 950° F. and containing approximately 2% oxygen. Heating and cooling of the two reaction zones was accomplished as hereinafter described.

The conversion products from the catalytic treatment were fractionated and gasoline corresponding to approximately 28% by volume of the charge plus a small amount of non-vaporous residue was separated from the higher boiling intermediate conversion products. The heavier portion of the intermediate conversion products was returned to the catalytic treatment, while the lighter portion thereof was heated to a temperature of approximately 925° F. and thereafter passed in indirect heat exchange relationship with the reaction zone in which the hydrocarbons were being converted.

The intermediate conversion products employed as a heating medium in the catalytic conversion zone were subsequently commingled with conversion products formed in the thermal cracking treatment, and the mixture fractionated to separate non-vaporous residue and gasoline boiling range hydrocarbons from the intermediate boiling range hydrocarbons which were condensed as light and heavy reflux condensates, and the latter subjected to thermal cracking treatment in a heating coil and communicating reaction chamber at a temperature of approximately 1000° F. and at a superatmospheric pressure of 600 pounds per square inch. Gasoline corresponding to 42% by volume of the charge was recovered from this operation.

Light reflux condensate, formed as previously described, was heated to 925° F. and the resulting highly heated oil passed in indirect heat exchange relationship with the reaction zone in which the catalyst was undergoing regeneration. The resulting highly heated reflux condensate was thereafter commingled with the conversion products undergoing the thermal cracking treatment and the mixture fractionated as previously described.

I claim as my invention:

1. In a process for the conversion of hydrocarbon oil wherein said hydrocarbon oil is subjected to treatment in the presence of a catalytic material capable of promoting the desired reaction, and intermediate conversion products formed in the catalytic treatment are subjected to thermal cracking treatment, said catalytic cracking treatment comprising the use of a plurality of reaction zones each of which is alternately employed in catalytic conversion processing and catalyst regeneration, said processing involving an endothermic reaction, and said regeneration involving an exothermic reaction, the improvement which comprises passing a stream of light intermediate conversion products formed in the process in contact with the exterior of the endothermic reaction zone to supply heat of conversion to the reactants therein, simultaneously passing another stream of light intermediate conversion products in contact with the exothermic reaction zone to absorb heat produced in regenerating the catalyst contained therein, and heating each of said streams to the desired temperature level in separate heating zones prior to their contact with the exterior of the respective reaction zones.

2. In a process for the conversion of hydrocarbon oil wherein said hydrocarbon oil is subjected to treatment in the presence of a catalytic material capable of promoting the desired reaction, an intermediate conversion products formed in the catalytic treatment are subjected to thermal cracking treatment, said catalytic cracking treatment comprising the use of a plurality of reaction zones each of which is alternately employed in catalytic conversion processing and catalyst regeneration, said processing involving an endothermic reaction, and said regeneration involving an exothermic reaction, the improvement which comprises passing light intermediate conversion products formed in the catalytic cracking treatment in contact with the exterior of the endothermic reaction zone to supply the heat of conversion to the reactants therein, simultaneously passing a stream of light intermediate conversion products from the thermal cracking treatment in contact with the exterior of the exothermic reaction zone to absorb the heat produced in regenerating the catalyst, and heating each of said streams to the desired temperature level prior to their contact with the exterior of the respective reaction zones.

3. In a process for the conversion of hydrocarbon oil wherein said hydrocarbon oil is subjected to treatment in the presence of a catalytic material capable of promoting the desired reaction, and intermediate conversion products formed in the catalytic treatment subjected to thermal cracking treatment, said catalytic cracking treatment involving the use of a plurality of reaction zones each of which is alternately employed in catalytic conversion processing and catalyst regeneration, said processing involving an endothermic reaction, and said regeneration involving an exothermic reaction, the improvement which comprises passing a stream of light intermediate conversion products formed in the catalytic cracking treatment in contact with the exterior of the endothermic reaction zone to supply heat of conversion to the reactants therein, thereafter passing said stream in contact with the exterior of the exothermic reaction zone to absorb heat produced in regenerating the catalyst, and heating said stream to the desired temperature level in separate heating zones prior to its contact with the exterior of each of the reaction zones.

4. A process for the conversion of hydrocarbon oil, which comprises heating and vaporizing said hydrocarbon oil and subjecting the heated stream of vapors to catalytic conversion treatment in a reaction zone containing catalytic material, simultaneously therewith subjecting catalytic material contained in another reaction zone to regeneration by contacting therewith a stream of oxygen-containing reactivating gases, separating the products of the catalytic conversion treatment into gasoline and lighter hydrocarbons, light and heavy intermediate conversion products, and non-vaporous liquid residue, recovering the gasoline and residue, subjecting said heavy intermediate conversion products to further catalytic conversion treatment, supplying heat to the first mentioned reaction zone by passing in indirect heat exchange relationship therewith said light intermediate conversion products after heating the same in an external heating zone, subsequently commingling said light intermediate conversion products with conversion products formed as hereinafter set forth, and recovering from the mixture non-vaporous liquid residue and gasoline boiling range hydrocarbons, separately recovering the reflux condensate and subjecting the heavier portion thereof to thermal cracking treatment in a heating coil and communicating reaction chamber and passing the lighter portion of said reflux condensate in indirect heat exchange relationship with the second mentioned reaction zone as a cooling medium during regeneration, and thereafter commingling said lighter portion with the conversion products from said thermal cracking treatment and with said light intermediate conversion products for treatment as hereinbefore set forth.

5. A process for the conversion of hydrocarbon oil, which comprises heating and vaporizing said hydrocarbon oil and subjecting the heated stream of vapors to catalytic conversion treatment in a reaction zone containing catalytic material, simultaneously therewith subjecting catalytic material contained in another reaction zone to regeneration by contacting therewith a stream of oxygen-containing reactivating gases and alternately switching the separate streams from one reaction zone to the other, separating the products of the catalytic conversion treatment into gasoline and lighter hydrocarbons, light and heavy intermediate conversion products, and non-vaporous liquid residue, recovering the gasoline and residue, subjecting said heavy intermediate conversion products to further catalytic conversion treatment, supplying heat to the first mentioned reaction zone by passing in indirect heat exchange relationship therewith said light intermediate conversion products after heating the same in an external heating zone, subsequently commingling said light intermediate conversion products with conversion products formed as hereinafter set forth, and recovering from the mixture non-vaporous liquid residue and gasoline boiling range hydrocarbons, separately recovering the reflux condensate and subjecting the heavier portion thereof to thermal cracking treatment in a heating coil and communicating reaction chamber and passing the lighter portion of said reflux condensate in indirect heat exchange relationship with the second mentioned reaction zone as a cooling medium during regeneration, and thereafter commingling said lighter portion with the conversion products from said thermal cracking treatment and with said light intermediate conversion products for treatment as hereinbefore set forth.

6. The process set forth in claim 5 wherein the lighter portion of the reflux condensate passed in indirect heat exchange relationship with the second mentioned reaction zone is heated in an external heating zone to the desired temperature level prior to its introduction thereto.

7. A hydrocarbon conversion process which comprises subjecting the hydrocarbons to endothermic catalytic conversion in a first reaction zone, simultaneously in another reaction zone subjecting catalyst to exothermic regeneration to remove carbonaceous matter deposited in a prior processing period, fractionating the resultant vaporous products from said first zone to condense and separate heavier fractions thereof, heating resultant reflux condensate to cracking temperature, passing the same in indirect heat exchange with the hydrocarbons in the first reaction zone to supply heat for the endothermic conversion therein, thereafter introducing said reflux condensate to a thermal cracking step, fractionating vaporous products of the thermal cracking to condense heavier fractions thereof, and passing resultant thermal reflux condensate in indirect heat exchange with the catalyst undergoing regeneration in said other reaction zone to absorb heat of the burning operation.

GORDON B. ZIMMERMAN.